Patented Dec. 19, 1944

2,365,431

UNITED STATES PATENT OFFICE 2,365,431

PROCESS OF PREPARING N-MONOCHLORINATION PRODUCTS OF HIGH-MOLECULAR FATTY ACID AMIDES

Ludwig Orthner, Frankfort-on-the-Main, and Theodor Jacobs, Weisbaden, Germany; vested in the Alien Property Custodian No Drawing. Application April 19, 1941, Serial No. 389,428. In Germany May 28, 1940

4 Claims. (Cl. 260—404)

The present invention relates to a process of preparing N-monochlorination products of high-molecular fatty acid amides useful as intermediate products in the manufacture of auxiliaries in the textile industry.

N-chlorinated products of carboxylic acid amides are formed as intermediate products in the reaction of carboxylic acid amides with chlorine in the presence of alkali to obtain primary amines. This Hoffmann reaction can be carried through with success only with carboxylic acid amides of low molecular weight; it fails when compounds having more than 8 carbon atoms are used. It is already known by "Berichte der Deutschen Chemischen Gesellschaft," 30, 1897, page 899, to prepare palmitic acid chloramide by the action of a large excess of hypochlorous acid and sodium hypochlorite on a saturated alcoholic solution of palmitic acid amide. This method is regarded as very complicated and troublesome and, as has been found, cannot be carried through in a satisfactory manner.

Now we have found that N-chlorination products of high molecular fatty acid amides are readily obtained at ordinary temperature or a slightly raised temperature by causing chlorine to act upon aqueous suspensions of fatty acid amides having at least 16 carbon atoms. Care must suitably be taken for using the acid amides in as fine a subdivision as possible. The finer the subdivision, the purer are the chlorinated products obtained. A particularly fine suspension may be obtained by a small addition of the usual water-soluble distributing agents, for instance the alkylated or aralkylated naphthalene-sulfonic acids, the sulfonates of fat alcohols, the reaction products of oleic acid chloride and methyl-taurine, the condensation products of ethylene oxide and hydroxyl compounds of high molecular weight. Useful suspensions are likewise obtained by other methods, for instance by dissolving the acid amide in acetone and pouring the solution obtained into water or dilute acetic acid. Fatty acid chloro-amides in a pure, readily filterable form are obtained in a technically simple manner and a theoretical yield according to the process herein described. The products obtained may be used as intermediate products for the manufacture of adjuvants in the textile industry.

The following examples serve to illustrate the invention, but they are not intended to limit it thereto, the parts being by weight:

(1) 28.3 parts of ground, commercial stearic acid amide melting at 98° C. are treated in a ball mill together with 50 parts of water and 0.3 part of a paste of oleic acid methyl tauride of 35 per cent strength until after several hours a fine magma is obtained which is introduced together with 150 parts of water into a chlorination vessel having a capacity of 500 cc. and being provided with a stirrer. At about 30° C. a moderately rapid current of chlorine gas is then introduced in a quantity somewhat above the theoretical quantity. 100 cc. of 30° C. are again added and such a further quantity of chlorine gas is introduced as is necessary for rendering visible crystalline products in the reaction mass which is at first of a milky and turbid appearance. The crystalline products generally become visible in the presence of an excess of chlorine of 10 to 15 per cent. The whole is allowed to cool and stirring is continued for some hours at ordinary temperature.

The mono-chlorination product is filtered with suction, carefully washed and well pressed. The yield amounts to 100 per cent. Stearic acid mono-chloroamide is soluble in ether to a clear solution and melts at 67° C. to 68° C. Bodies having a melting point substantially higher than that afore-named indicate an incomplete chlorination and bodies of a melting point considerably below 67° C.–68° C. give a hint at a per-chlorination.

The stearic acid mono-chloroamide is stable but not for any length of time. The initially odorless substance gives off after a prolonged standing—and still more rapidly on drying—considerable portions of chlorine already at a moderate temperature under reduced pressure; the body gradually becomes more sparingly soluble in ether and assumes a higher melting point by the re-formation of stearic acid amide.

Analysis of a test dried on clay:

Found 11.25 per cent of Cl; calculated 11.18 per cent.

Found 4.7 per cent of N; calculated 4.4 per cent.

If palmitic acid amide is treated in an analogous manner there is obtained palmitic acid mono-chloroamide melting at 69° C.–70° C. when dried on clay.

Analysis:

Found 12.8 per cent of Cl; calculated 12.2 per cent.

Found 4.53 per cent of N; calculated 4.6 per cent.

The chemical behaviour of the compound very much resembles that of the stearic acid mono-chloroamide.

(2) 28.3 parts of commercial stearic acid amide are dissolved on the vapor bath in 60 cc. of glacial acetic acid. The solution is slowly poured, while rapidly stirring, into a mixture of 250 cc. of water and 100 cc. of acetone and the whole is stirred for some time. The theoretical portion of chlorine is then introduced at 30° C.–35° C. Towards the end of the chlorination process the mixture which is at first milky and turbid becomes transparent and the chlorine compound separates in crystal lumps. The whole is further stirred for 1–2 hours and diluted with water. The product is filtered with suction and washed with water. This method of operating has the advantage that the grinding of the starting substance may be avoided and that only the substantially theoretical quantity of chlorine is required. The termination of the process is evident by the fact that the supernatent liquid becomes entirely clear so that a per-chlorination is not possible.

We claim:

1. The process of preparing N-monochlorination products of high molecular fatty acid amides, which comprises dispersing a high molecular fatty acid amide, containing at least 16 carbon atoms, in water, introducing a current of chlorine gas into the thus-obtained aqueous dispersion, continuing the introduction of such chlorine gas to said dispersion until crystalline products become visible in the reaction mixture; thereafter separating the thus-obtained N-monochlorination products from said reaction mixture.

2. The process of preparing N-monochlorination products of high molecular fatty acid amides, which comprises dispersing a high molecular fatty acid amide, containing at least 16 carbon atoms, in water containing a small amount of a water-soluble dispersing agent, introducing chlorine gas into the thus-obtained dispersion, while maintaining the dispersion at a temperature of about 30° C., continuing the introduction of said chlorine gas into said dispersion until crystalline products become visible in the reaction mixture and thereafter separating the thus-obtained N-monochlorination product from said reaction mixture.

3. The process as defined in claim 1, wherein the high molecular fatty acid amide is stearic acid amide.

4. The process as defined in claim 1, wherein the high molecular fatty acid amide is palmitic acid amide.

LUDWIG ORTHNER.
THEODOR JACOBS.